United States Patent [19]
Picard

[11] Patent Number: 5,700,023
[45] Date of Patent: Dec. 23, 1997

[54] VEHICLE FORMED FROM A SERIES OF MODULES INTERCONNECTED BY A COMPOSITE ARTICULATED CONNECTION

[75] Inventor: Antoine Picard, Obernai, France

[73] Assignee: Lohr Industrie, Hangenbieten, France

[21] Appl. No.: 532,570

[22] PCT Filed: Apr. 19, 1994

[86] PCT No.: PCT/FR94/00440

§ 371 Date: Nov. 29, 1995

§ 102(e) Date: Nov. 29, 1995

[87] PCT Pub. No.: WO94/23985

PCT Pub. Date: Oct. 27, 1994

[30] Foreign Application Priority Data

Apr. 19, 1993 [FR] France ................................. 93 04731

[51] Int. Cl.[6] ................................................ B62D 53/00
[52] U.S. Cl. .................................... 280/426; 280/411.1
[58] Field of Search ................................ 280/426, 408, 280/411.1, 442, 443, 444

[56] References Cited

U.S. PATENT DOCUMENTS 3,290,058  12/1966  Ellerd ............................ 280/442 X
4,235,451  11/1980  Leriverend ........................ 280/408
4,441,730   4/1984  Damm ......................... 280/442 X
4,586,578   5/1986  Brown et al. .................. 280/442 X
5,052,707  10/1991  Timan ............................ 280/403

FOREIGN PATENT DOCUMENTS 0519813  6/1992  European Pat. Off. .
2549436  7/1983  France .

*Primary Examiner*—Kevin Hurley
*Attorney, Agent, or Firm*—Davis and Bujold

[57] ABSTRACT

The articulated vehicle is formed from a plurality of modules interconnected in an articulated fashion, including one leading module (1) with a front steering set of wheels (12), a rear module (3) with a controlled orientable rear set of wheels (13) and, optionally, one or more intermediate modules (2), a vehicle wherein two successive modules are connected by a movable articulation support (6, 7) carried by an axle and duplicated by a rigid oblique articulated connection (8,9), the orientation of each movable articulation support (6, 7) and that of the rear orientable wheel set (13) being controlled in such a way that its transverse median axis corresponds at all times to the bisector of the angle formed by two successive modules.

12 Claims, 7 Drawing Sheets

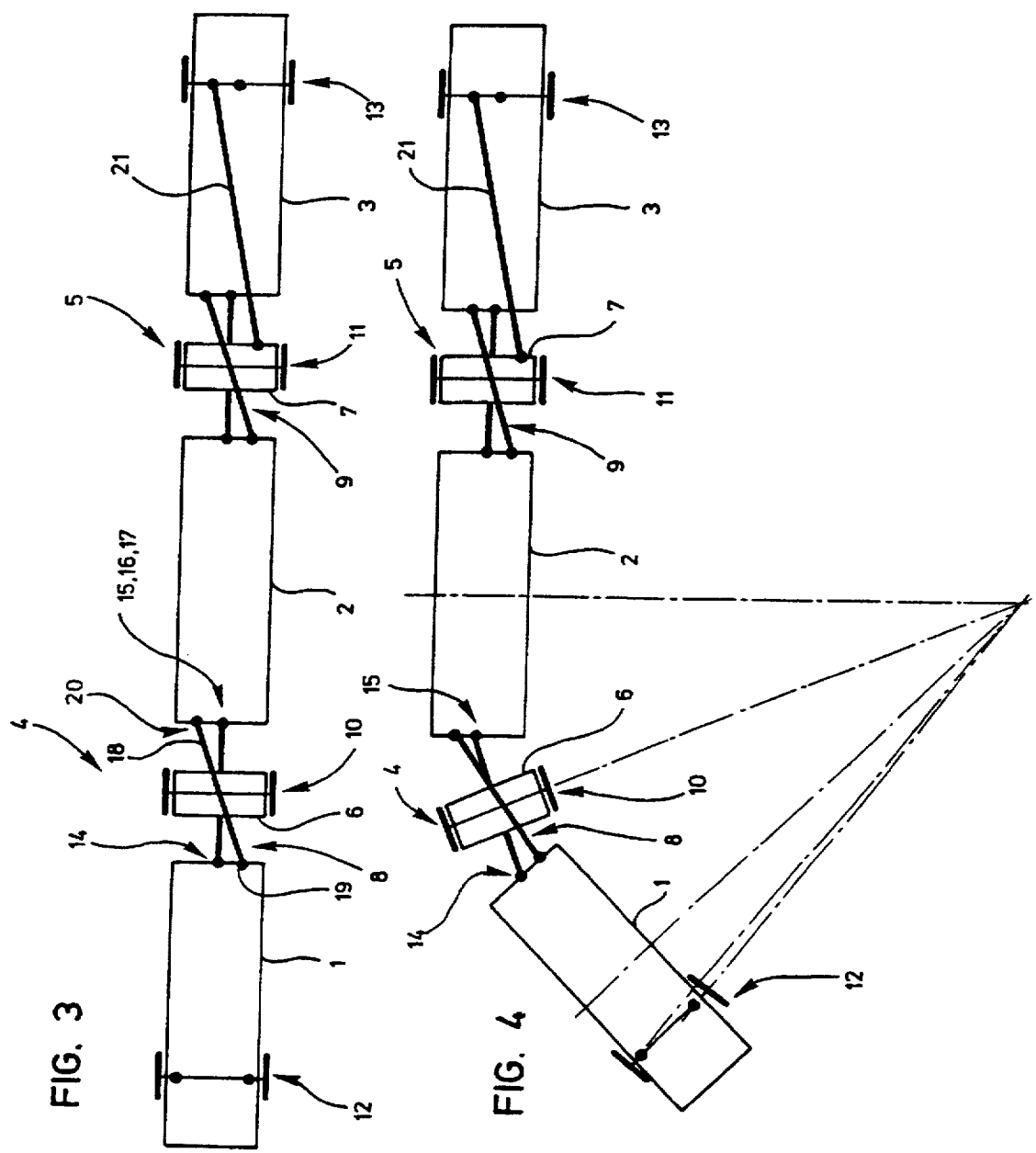

VEHICLE FORMED FROM A SERIES OF MODULES INTERCONNECTED BY A COMPOSITE ARTICULATED CONNECTION

The invention relates to an articulated vehicle composed of a series of several modules interconnected by a composite articulated connection comprising at least one elastic articulation with controlled movement.

The development of road transport, notably the transport of goods and transport of people in an urban or semiurban environment, has led to the need for vehicles with a high loading and passenger capacity.

However, these vehicles must also comply with legal requirements, notably with respect to their size, and with handling constraints related to their use.

A design in the form of several interconnected articulated modules forming a train offers significant advantages, notably as regards the total length obtained with identical or different modules of reduced length, but also driving comfort, in particular on curves.

This is particularly true for urban transport, which must sometimes follow a path in traffic lanes that is often narrow and tortuous, and which includes horizontal and vertical curves.

However, production in the form of articulated modules presents design and production difficulties, these difficulties increasing with the number of modules.

The relative positions of the sets of wheels, both in a straight line and on a bend, must be controlled so as to avoid shifts and divergences from the trajectory, slipping, phenomena of oscillation or deflection in certain modules, notably intermediate modules or the end module.

Another problem relates to irregularities in the roadway, for example bumps, banking or localized subsidence. The relative positions of the modules must also be controlled in this type of movement between the modules.

To this end, various devices for controlling the relative positions of the modules of a modular vehicle and its wheel sets are known. But devices using rams or automated control, for example electronic, are costly and complicated.

There exist devices which are simply mechanical or with variable geometry, for example the one described in U.S. Pat. No. 5 052 707, in the name of Timan, which relates to a device with articulated arms for controlling the position of an intermediate module for intercommunication between the other two parts of an articulated vehicle.

But this device comprising several deformable parallelograms placed in the upper position proves to be particularly bulky. Moreover, it requires the end structure of at least one of the modular elements to be asymmetrical, resulting in reduced suitability for modularity, and production complications.

Furthermore, the EP publication No. 0 519 813 in the name of GEC ALSTHOM describes a connection device for a vehicle articulated at the intercommunication passage, formed by oblique links connected by connection elements, forming a parallelogram able to be deformed in the upper part.

This device provides control of the position of the intercommunication passage only in one type of movement, that resulting from horizontal curves. Its principal function is limited to centering the upper part of the intermediate element between the two cars.

The aim of the invention is to overcome these drawbacks by proposing a vehicle articulated in a simple mechanical fashion, making it possible to ensure better relative maintenance in position of the modules of which it is composed, near-perfect following of the curves and irregularities in the roadway, and a substantial limitation of extraneous movements of the modules relative to each other, even for road trains composed of two or more modules.

To this end, the invention consists of an articulated vehicle comprising a plurality of modules interconnected by a composite articulated connection with a movable articulation support, provided with wheels and with an oblique connection, the front end module having a steering set of wheels and the rear end module a fixed or following rear set of wheels, a vehicle in which each movable articulation support is connected to one of the modules by a connection with three degrees of freedom, and to the other module by a double connection formed by a lower connection with three degrees of freedom and an upper connection consisting of an elastic connection with controlled movement.

The invention presents numerous advantages, in terms of simplicity of construction, cost, reliability, efficacy and performance.

It proves to be particularly well suited to public passenger transport in an urban setting, since it allows the circulation of long vehicles without reducing maneuverability.

Notably, the invention affords a substantial improvement in behavior during pitching and rolling.

This articulation device enables the whole vehicle to be made virtually isostatic, thereby considerably reducing the dynamic forces borne by the structures.

Other technical characteristics and advantages of the invention will appear in the description that follows, given by way of example and accompanied by the drawings in which:

FIG. 3 is a diagrammatic plan view of the vehicle with the modules in the aligned position;

FIG. 4 is a diagrammatic plan view of the vehicle at the start of a horizontal bend;

The general inventive idea consists of connecting the modules of an articulated vehicle by means of composite articulated connections each formed from a movable articulation support carried by an axle and a complementary connection by means of an oblique link, each movable articulation support being connected to one of the modules by a connection with three degrees of freedom and to the other module by a double articulated connection whose lower articulation is an articulation with three degrees of freedom and the upper articulation an articulation, for example elastic, with controlled movement.

Thus each articulation support is connected in an articulated fashion on the one hand to one of the adjacent modules by an articulation of the swivel joint type and on the other hand to the other adjacent module by a double articulation constituting an inverted pivot with a pendular movement of limited magnitude.

According to the preferred embodiment, each one or at least one or one out of two of the movable articulation supports is carried by a driving axle. All the propulsive force of the vehicle then comes solely, according to this embodiment, from the driving axles carrying the movable articulation supports.

Figure 1:
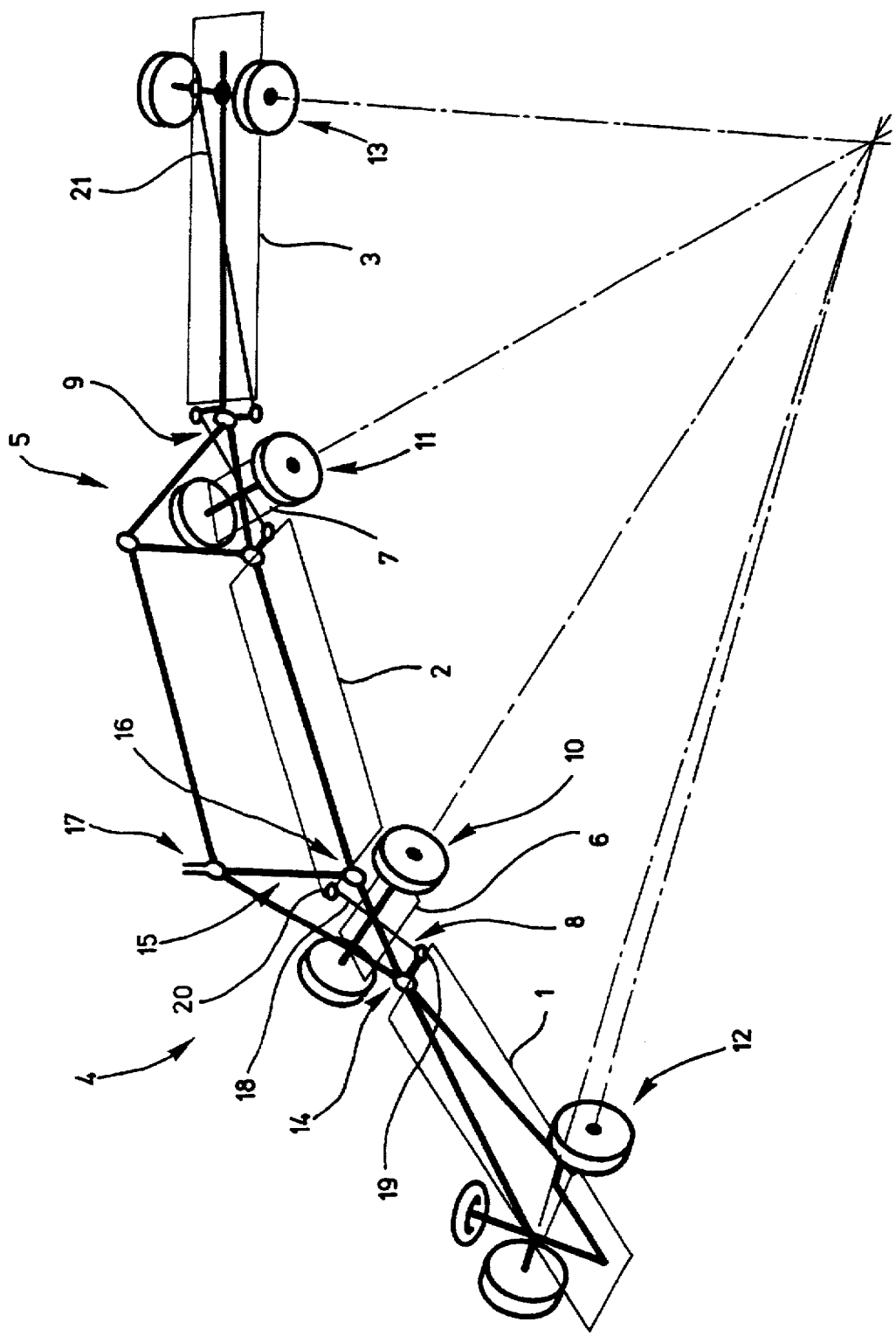
FIG. 1 is an overall diagrammatic view in perspective of an articulated vehicle with three modules, showing only the components affected by the invention.

An example of an articulated vehicle with three modules according to the invention is depicted in FIG. 1.

It constitutes the basic version of the invention, which extends equally to a vehicle with two modules and to vehicles with more than three modules.

It is composed of a leading module 1, an intermediate module 2 and a rear module 3. These modules are interconnected in an articulated fashion by double composite connections such as 4 or 5, formed on the one hand by a movable articulation support 6 or 7 and on the other hand by an oblique articulated connection 8 or 9.

Each movable articulation support 6 or 7 is carried by an axle or a wheel set 10 or 11 whose direction is fixed with respect to the body of the movable articulation support.

The leading module 1 is provided with a steering set of wheels 12 at the front, and the rear module 3 has a fixed or following set of wheels 13 at the rear. This set of wheels can be oriented, as depicted, by being made dependent on the position of the adjacent movable articulation support by means of a specific articulated transmission connection.

This rear wheel set can also be fixed in the case of a simplified embodiment.

The articulated connections 4 or 5 between the modules are similar, and this would also be true if the vehicle had a larger number of modules. For this reason, only the composite articulated connection 4 existing between the leading module 1 and the intermediate module 2 will be described.

The front movable articulation support 6, taken as an example, is connected to the leading module 1 in a so-called front/rear presentation by a single front connection articulation 14 with three degrees of freedom, for example of the type with a swivel joint or universal joint, and to the following module, here the intermediate module 2, by a double rear articulated connection 15, providing the general function of a reversed swinging vertical pivot, that is to say one free to make pendular movements. This double rear articulation 15 consists of a bottom articulation 16 of the type with a swivel joint or a universal joint with a horizontal principal axis and an elastic top articulation 17 with controlled movement, designed to absorb all the forces due to rolling and pitching movements and the composition thereof.

This pivot therefore has a swinging movement absorbing the amplitudes of the rolling movements related to variations in the shape of the road and to the movements of the bodies of the modules.

In addition, the movable articulation support is duplicated by the oblique articulated connection in the form of an oblique control link 18, articulated at one of its ends 19 on the chassis of the preceding module, and at its other end 20 on the chassis of the following module, at two points on their facing ends offset symmetrically with respect to the common central longitudinal axis of the successive modules when they are aligned. The oblique control link 18 is mounted on the ends of the chassis by unidirectional articulations, for example of the swivel joint or universal joint type.

The above articulated connections form a set of articulations disposed in the form of a triangle as depicted in the figures. In these figures, the vertices of the triangles are situated on the same side as the intermediate module 2. Of course, the invention is in no way dependent on this type of configuration, but on the contrary extends equally to both possibilities for the orientation of this triangle, namely vertex articulated on the front module or vertex articulated on the following module.

In particular, the double articulated connection 15 can exist at the front of each following module, including the rear module.

As can be observed in the first figures, the front 6 and rear 7 movable articulation supports afford the equivalent of a universal-joint coupling or a swiveling link apart from the rolling and pitching movements. Thus two successive modules are connected by an articulated connection taking a form equivalent to that of two crossed-over links.

As depicted by way of example in FIG. 1, a double articulated connection 15 providing the function of a reversed pendular pivot is used at each end of the intermediate module 2 for the vehicle with three articulated modules, and this in a reversed fashion. This is because the front movable articulation support 6 has the single articulation 14 towards the front and the double articulated connection 15 towards the rear, while the rear movable articulation support 7 has a reversed orientation.

Though used by way of illustration, this arrangement is in no way obligatory in character.

In this way, the present invention makes it possible to produce an articulated assembly with five elements, three modules and two movable articulation supports, which is in theory the perfect equivalent of an articulated isostatic assembly with three elements.

In a non-obligatory way, it is possible to provide, at the top end facing the single bottom articulation 14, a damping connection, formed for example by two dampers disposed in a V formation.

The inter-module composite articulated connection 4 or 5 has the following particularity. In a curve situated in a horizontal plane, the median transverse axis of each movable articulation support is made to correspond at all times to the bisector of the angle formed by the two successive modules that it connects.

This constitutes the most advantageous geometry for traveling on a curve, since the axes of the axles or their geometric equivalents pass through the instantaneous center of rotation.

In a vertical curve developing longitudinally, for example the start of a slope, or a pitching, the relative pivoting takes place between the preceding or following module and the adjacent movable articulation support by means of the single swivel-joint articulation 14.

Rolling movements are absorbed by the bottom articulations and the top articulation of the movable articulation supports.

The swinging movements of each intermediate module are absorbed by at least one elastic articulation 17 with controlled movement disposed at the top.

The combination of this elastic articulation 17 at the top with the articulation 16 of the swivel joint type facing it at the bottom enables the principal load forces and the vertical acceleration forces, and those of traction and braking, to be transmitted through the bottom connection. The articulation of the pivot type between the module and the movable support is free to pivot in a horizontal plane, and the other secondary movements are controlled by the top elastic connection designed to absorb the forces related to rolling and pitching.

In the embodiment with a rear orientable axle on the wheel set 13, the latter is pivotally mounted on the rear module 3. Its control consists of an articulated connection, for example an oblique link 21 connected in an articulated fashion by means of two articulations, one on the axle of the rear wheel set 13, the other on the rear movable articulation support 7, these two points of articulation being offset symmetrically with respect to a common longitudinal axis when the modules are aligned.

The link is mounted at its ends by an articulation of the swivel joint type with three degrees of freedom.

Of course, other means for controlling the rear directional wheel set can be provided. Similarly, the latter can equally well be of the pivoting axle type or of the type with steered wheels, as is the case with the front wheel set.

FIGS. 3 to 8 depict the relative positions of the movable articulation supports and modules in various configurations which may be found on a roadway.

These figures illustrate clearly the possibilities for the vehicle concerning the following of the trajectory, corresponding to the modular design and the articulated connections according to the invention. The trajectory of each module follows the trajectory of the preceding module very precisely.

Figure 2:
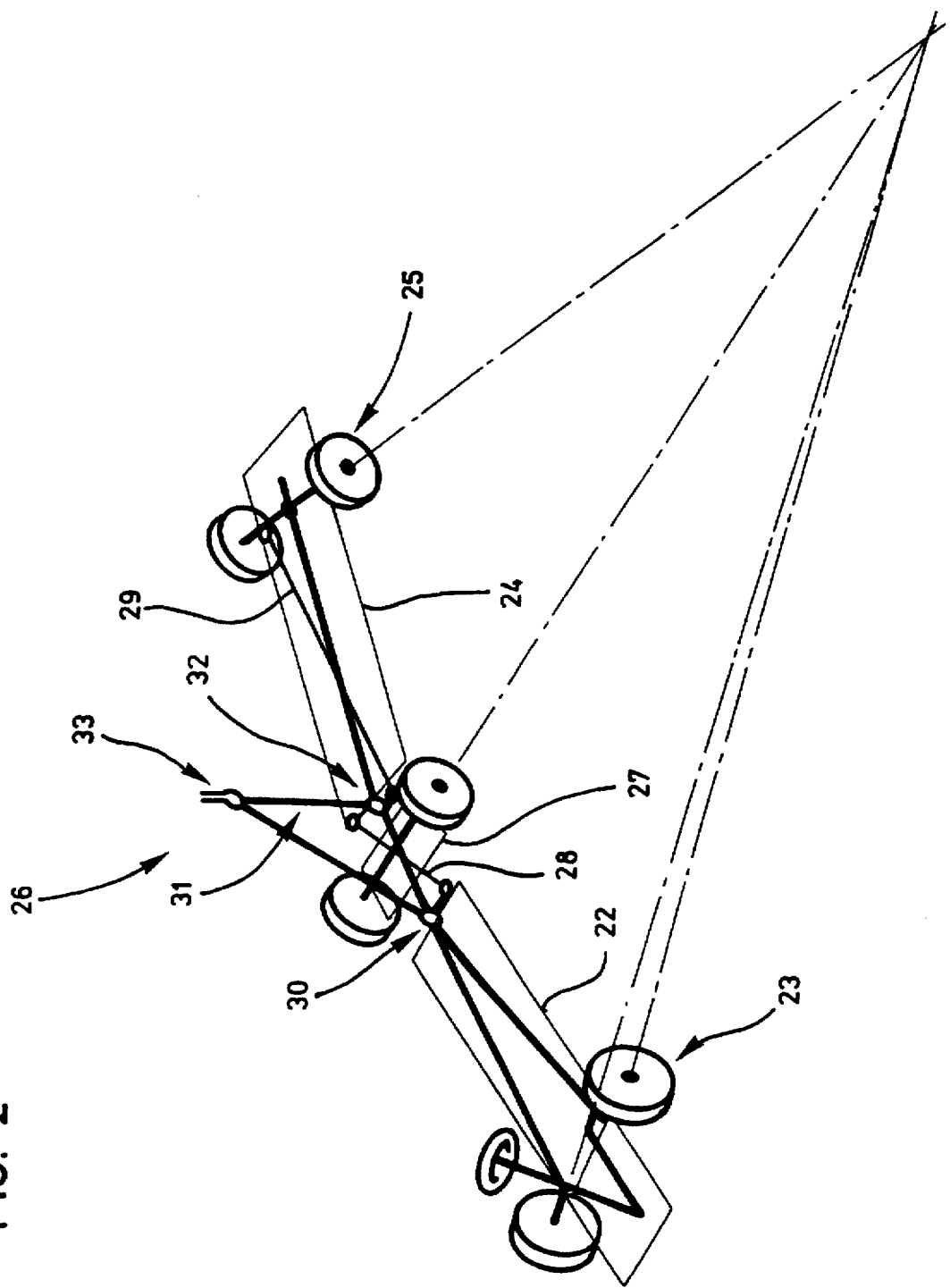
FIG. 2 is a view identical to that of FIG. 1, depicting an embodiment with two modules.
Figure 5:
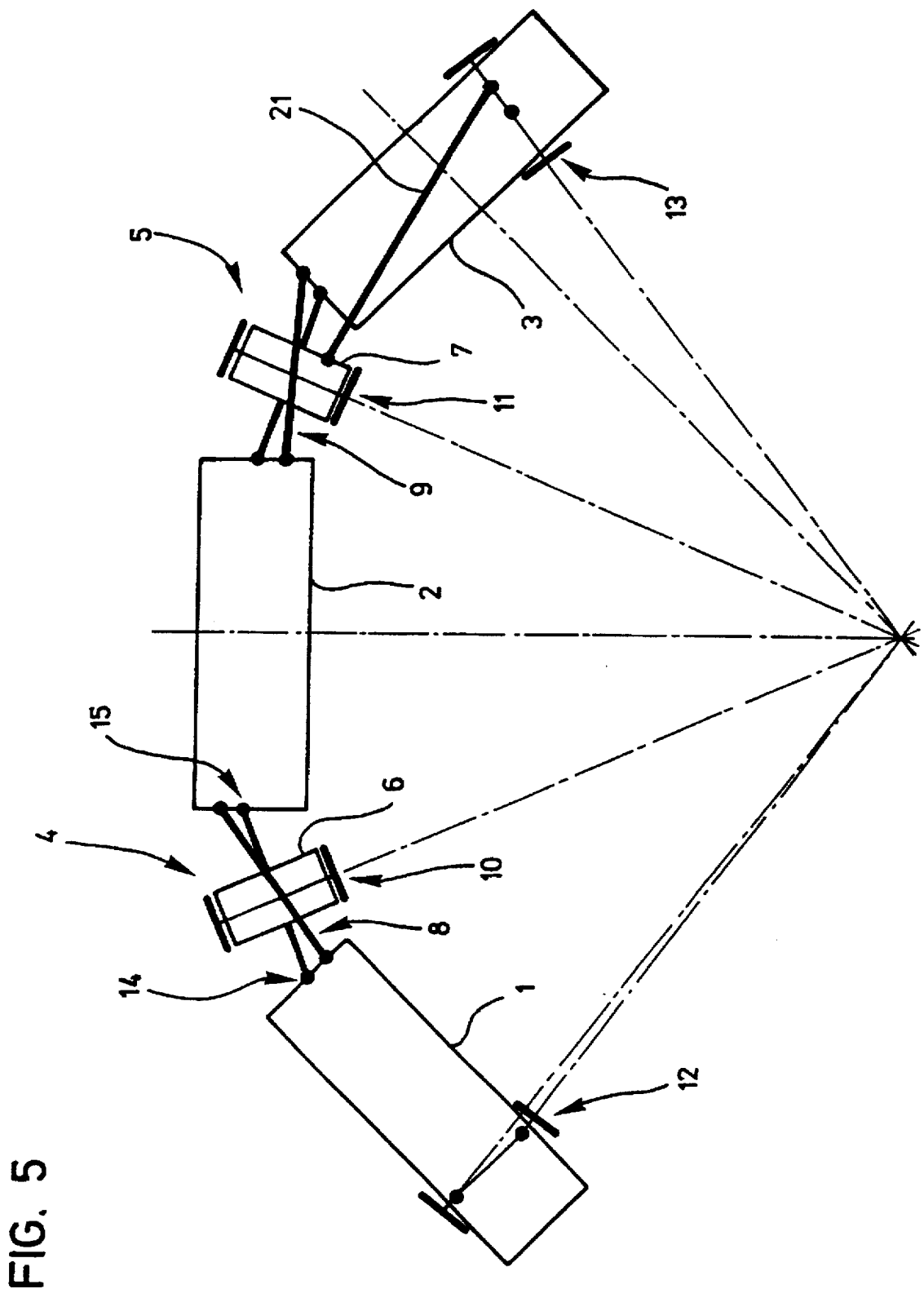
FIG. 5 is a diagrammatic plan view of the vehicle on a bend.
Figure 6:
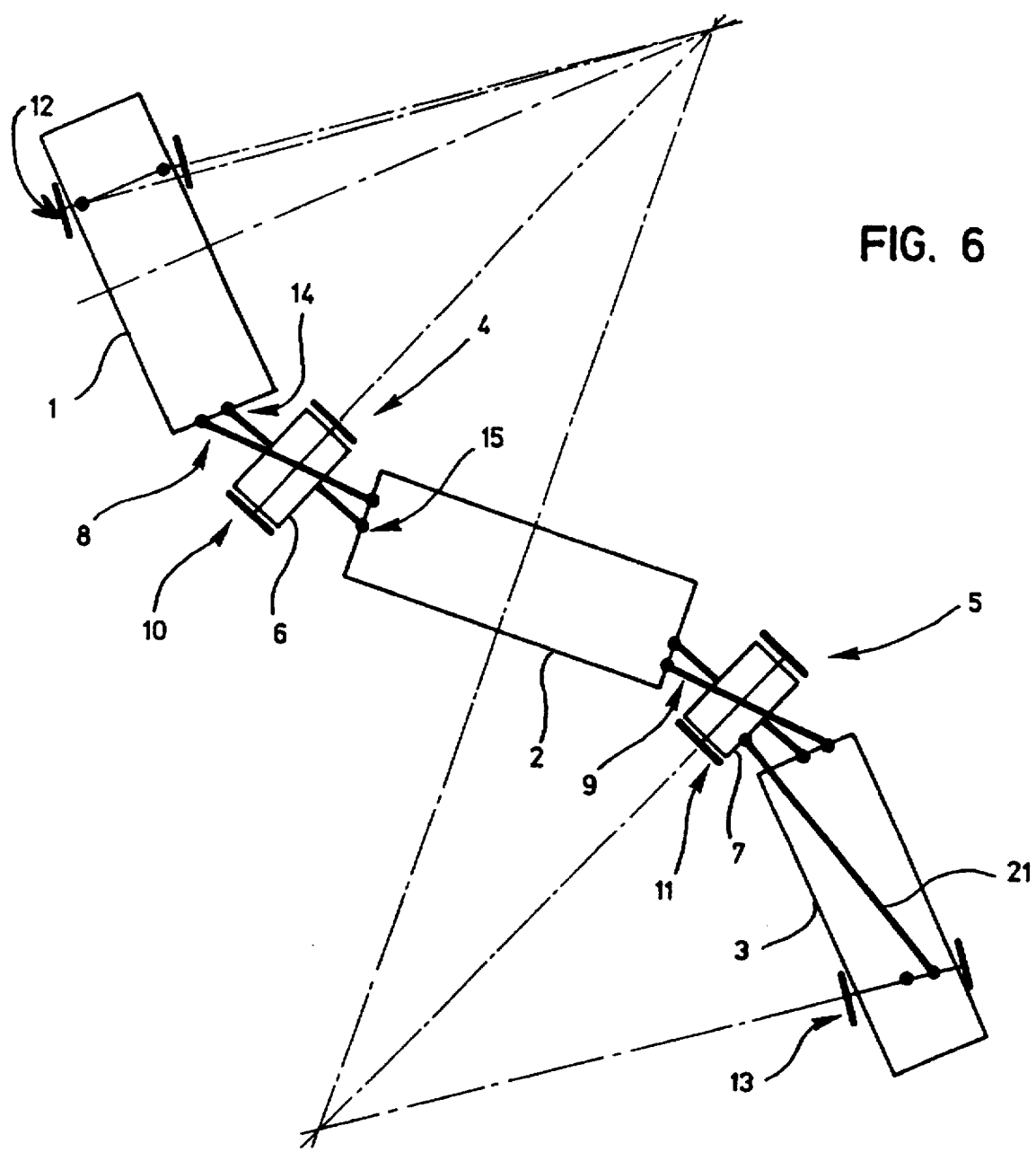
FIG. 6 is a diagrammatic plan view of the vehicle on an S-shaped bend.
Figure 7:
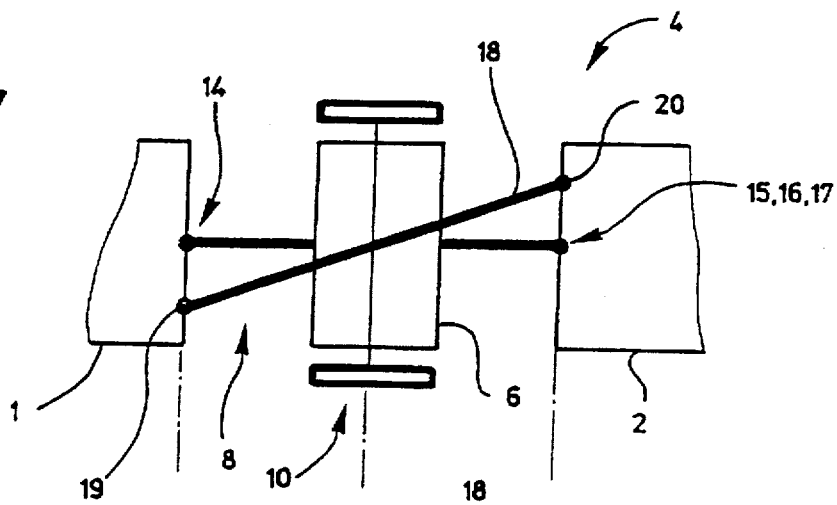
FIGS. 7, 8 and 9 are diagrammatic views in detail from above of a composite connection between two modules respectively in a straight line, on a slight bend and on a sharp bend.
Figure 8:
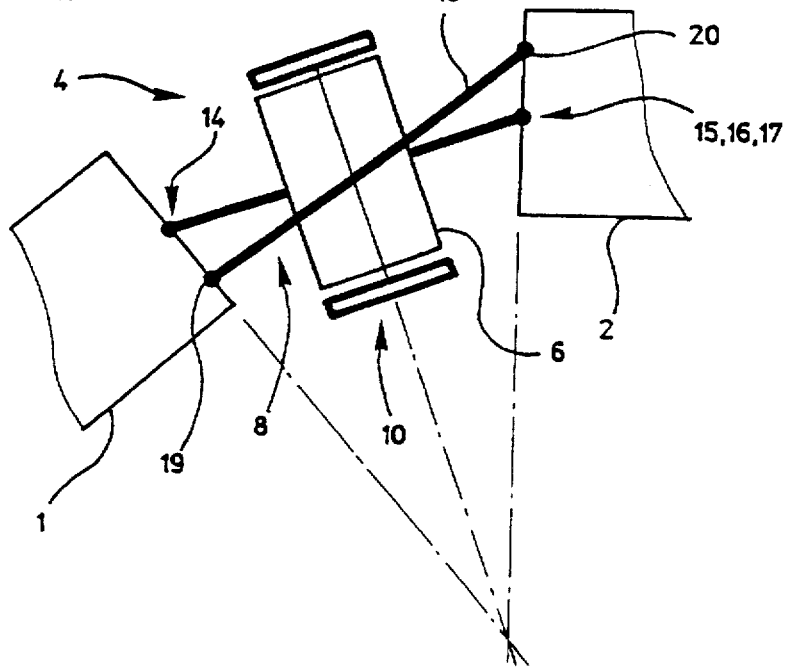
Figure 9:
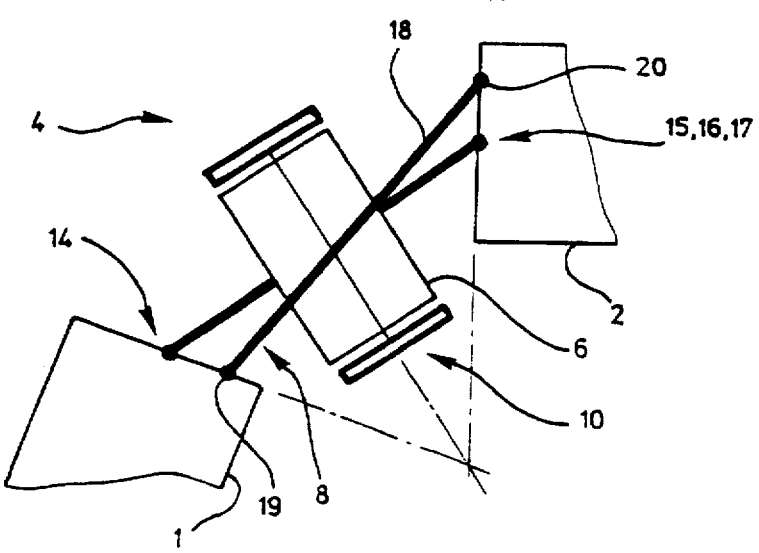
Figure 10:
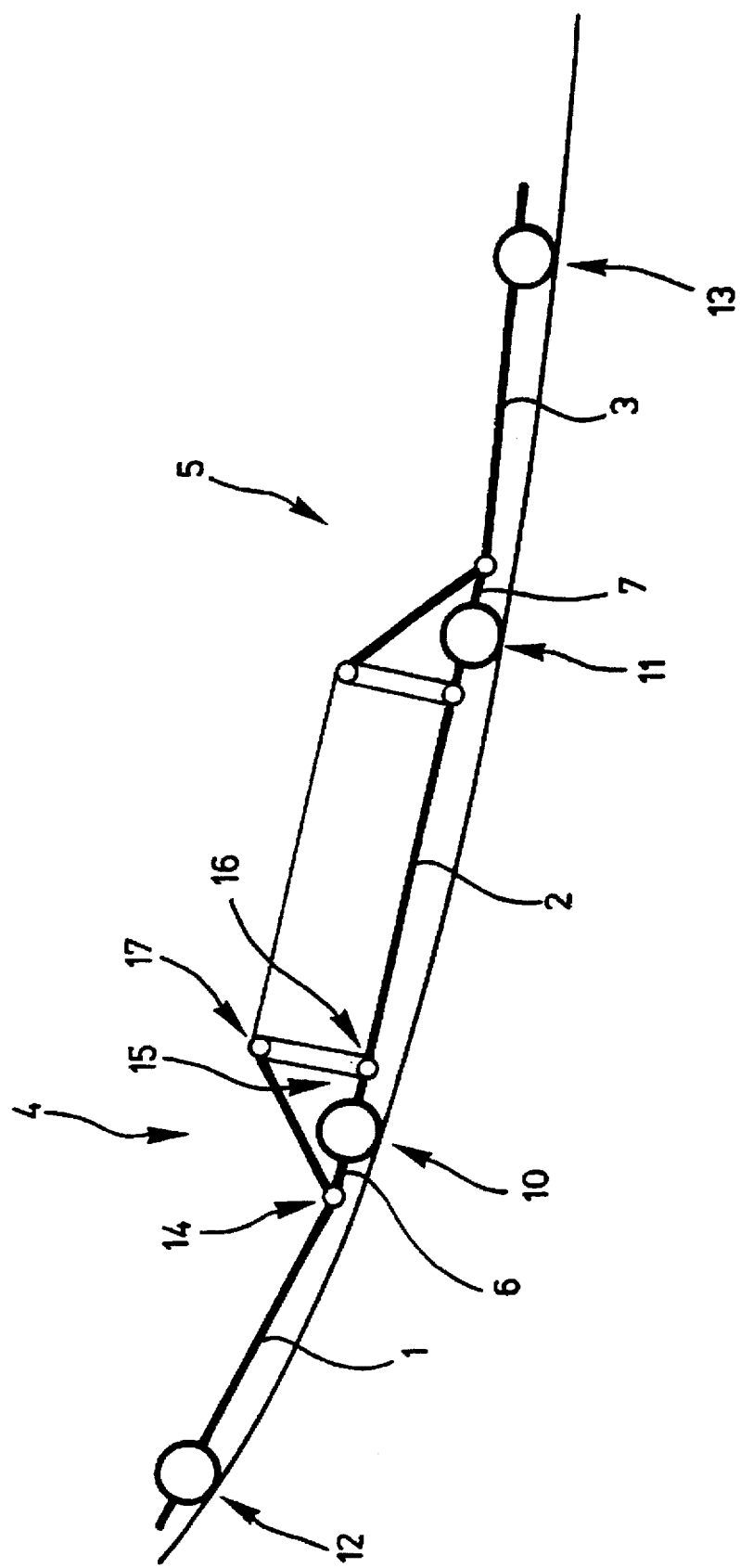
FIG. 10 is a diagrammatic profile view of the vehicle in a vertical curve.

Of course, the invention described for an articulated vehicle with three modules is applicable to a greater number of modules, or indeed to a vehicle having only two modules, as depicted in FIG. 2.

The front module 22 has a front steering set of wheels 23, and the rear module 24 a rear orientable wheel set 25, as described above in general terms.

These modules are interconnected by a single composite articulated connection 26 using a single movable articulation support 27 of the type described above, and an oblique articulated connection in the form of an oblique link 28. The control link 29 of the articulation of the rear orientable wheel set 25 is connected to this single movable articulation support 27.

The single movable articulation support 27 is connected to the front module 22 by a single connection of the swivel joint type 30, and to the rear module 24 by a double articulated connection 31, formed by a bottom articulation of the swivel joint type 32 and an elastic top articulation 33 with controlled movement.

The equivalent of a vehicle with two isostatic modules is thus obtained, except for pivoting in a horizontal plane.

What is claimed is:

1. An articulated vehicle having a plurality of modules interconnected with one another in an articulated manner, said articulated vehicle comprising:
   a leading module (1) having a leading end, a trailing end and a front steering set of wheels (12), a rear module (3) having a leading end, a trailing end and a rear set of follower wheels (13), and at least one intermediate module (2) having a leading end and a trailing end and being located between said leading module (11) and said rear module (3);
   wherein each pair of two adjacent modules is interconnected by a composite articulated connection (4, 5); and
   each said composite articulated connection (4, 5) comprises:
      at least one movable articulation support (6, 7) which is supported by an axle (10, 11), said movable articulation support is connected to a leading one of said pair of adjacent modules by a front connection articulation (14) and a trailing one of said pair of adjacent modules by a rear connection articulation (16) having three degrees of freedom, said front connection articulation (14) is connected at a median position to the trailing end of said leading one of said pair of adjacent modules, and said rear connection articulation (16) is connected at a median position to the leading end of said trailing one of said pair of adjacent modules;
      an oblique articulated connection (8, 9) extends obliquely with respect to a longitudinal axis of said articulated vehicle when said pair of adjacent modules are aligned with one another, said oblique articulated connection (8, 9) has a leading end and a trailing end, said oblique articulated connection leading end is connected at position that is offset from the median position of the trailing end of said leading one of said pair of adjacent modules, and said oblique articulated connection trailing end is connected to the leading end of said trailing one of said pair of adjacent modules at a position diagonal opposite offset with respect to said connected position of said oblique articulated connection leading end; and
      a double articulated connection (15) is formed by a connection between said rear connection articulation (16) and a top articulation (17) which has limited movement, and said front connection articulation (14) and said top articulation (17) are interconnected with one another by structure of said moveable articulation support (6, 7).

2. A vehicle according to claim 1, wherein said movable articulation supports (6, 7) are oriented so that one of said double articulated connections (15) is located at both said leading end of said intermediate module (2) and said trailing end of said intermediate module (2).

3. A vehicle according to claim 1, wherein said double articulated connection (15) is positioned at said leading end of said intermediate and said rear modules successively coupled to said leading module.

4. A vehicle according to claim 1, wherein the axle (10, 11) supported by at least one of said movable articulation supports (6, 7) is a driving axle.

5. A vehicle according to claim 1, wherein said rear wheel set (13) of said rear module (3) is orientable and controlled so that a transverse median axis of said rear wheel set (13) and a transverse median axis of the axle (11) of said intermediate module pass through an instantaneous center of rotation.

6. A vehicle according to claim 5, wherein the rear wheel set (13) of said rear module (3) is connected to be dependant upon a position of an immediately preceding movable articulation support (7).

7. A vehicle according to claim 1, wherein each said oblique articulated connection (18) is rigid and in the form of a connecting link mounted so as to be articulated at points offset symmetrically with respect to the longitudinal axis of said pair of adjacent modules when said modules are aligned with one another.

8. A vehicle according to claim 1, wherein said rear wheel set (13) is connected to be dependant upon a position of said movable articulation support (7) articulated to said rear module (3), by means of a rear oblique control link (21) having leading and trailing ends, said trailing end of said rear oblique control link (21) is connected to said rear wheel set (13) and said leading end of said rear oblique control link (21) is connected to said moveable articulation support (7) articulated to said rear module (7) so that said leading and trailing ends of said rear oblique control link (21) are offset symmetrically with respect to the longitudinal axis of said rear and said intermediate modules when said rear and said intermediate modules are aligned with one another.

9. A vehicle according to claim 8, wherein said leading and said trailing ends of said rear oblique control link (21) are connected by an articulation having three degrees of freedom.

10. A vehicle according to claim 9, wherein said articulation having three degrees of freedom is a swivel joint.

11. A vehicle according to claim 9, wherein said articulations having three degrees of freedom is a universal joint.

12. An articulated vehicle having a plurality of modules interconnected with one another in an articulated manner, said articulated vehicle comprising:

- a leading module (22) having a leading end, a trailing end and a front steering set of wheels (23), and a trailing module (24) having a leading end, a trailing end and a rear set of follower wheels (25), wherein said leading and said trailing modules are interconnected by a composite articulated connection (26);

said composite articulated connection (26) comprises:

- a movable articulation support (27) which is supported by an axle, said movable articulation support (27) is connected to said leading module by a front connection articulation (30) and to said trailing module by a rear connection articulation (16) having three degrees of freedom, said front connection articulation (14) is connected at a median position to the trailing end of said leading module, and said rear connection articulation (16) is connected at a median position to the leading end of said trailing module;

- an oblique articulated connection (28) extends obliquely with respect to a longitudinal axis of said articulated vehicle, when said leading and trailing modules are aligned with one another, said oblique articulated connection (28) has a leading end and a trailing end, said oblique articulated connection leading end is connected at position that is offset from the median position of the trailing end of said leading module, and said oblique articulated connection trailing end is connected to the leading end of said trailing module at a position diagonal opposite offset with respect to said connected position of said oblique articulated connection leading end; and

- a double articulated connection (31) is formed by a connection between said rear connection articulation (32) and a top articulation (33) which has limited movement, and said front connection articulation (30) and said top articulation (33) are interconnected with one another by structure of said moveable articulation support (27).

* * * * *